United States Patent [19]

White et al.

[11] Patent Number: 5,368,879
[45] Date of Patent: Nov. 29, 1994

[54] FLAVORFUL DRY FOOD CONDIMENT AND PROCESS OF PROVIDING THE SAME

[75] Inventors: Jackie L. White, Pfafftown; Thomas A. Perfetti, Winston-Salem, both of N.C.

[73] Assignee: R. J. Reynolds Tobacco Company, Winston-Salem, N.C.

[21] Appl. No.: 97,351

[22] Filed: Jul. 23, 1993

[51] Int. Cl.$^5$ ............................................. A23L 1/22
[52] U.S. Cl. .................................. 426/650; 426/655; 426/429; 426/431; 426/489; 426/589
[58] Field of Search .............. 426/425, 431, 650, 655, 426/489, 429, 589

[56] References Cited

U.S. PATENT DOCUMENTS

| | | | |
|---|---|---|---|
| 331,134 | 11/1885 | Hazard | 426/655 |
| 1,174,404 | 3/1916 | Fleming | 426/655 |
| 1,204,880 | 11/1916 | Kern | 426/655 |
| 2,367,789 | 1/1945 | Leo | 426/655 |
| 2,393,561 | 1/1946 | Perech | 426/655 |
| 4,075,361 | 2/1978 | Oberg | 426/655 |
| 4,181,743 | 1/1980 | Brumlick et al. | 426/241 |
| 4,376,132 | 3/1983 | Eguchi et al. | 426/431 |
| 4,539,212 | 9/1985 | Hunter | 426/325 |
| 4,590,085 | 5/1986 | Sidoti et al. | 426/582 |
| 5,064,673 | 11/1991 | Buttery et al. | 426/534 |
| 5,114,734 | 5/1992 | Kibles et al. | 426/650 |
| 5,118,520 | 6/1992 | Suzuki et al. | 426/564 |
| 5,127,953 | 7/1992 | Hamaguchi | 106/504 |
| 5,145,700 | 9/1992 | Von Lempke | 426/240 |

*Primary Examiner*—Jeanette Hunter

[57] ABSTRACT

A process for providing a flavorable composition for use as a food condiment is provided. The composition is provided by extracting a mixture of steak sauce ingredients to provide a steak sauce extract separated from the extracted mixture of steak sauce ingredients. The steak sauce extract is heated in a pressure-controlled environment to above ambient pressure at a temperature above about 100° C. The heat treated extract is then contacted with a substrate which is subsequently ground into powder form to provide a dry, powdered condiment useful as a steak sauce.

18 Claims, 1 Drawing Sheet

FLAVORFUL DRY FOOD CONDIMENT AND PROCESS OF PROVIDING THE SAME

BACKGROUND OF THE INVENTION

The present invention relates to a flavorful condiment useful for enhancing the flavor of meat and other foods, and in particular to a process for providing a flavorful dry condiment suitable as a steak sauce.

Typical condiments include catsup, mustard, steak sauce, barbeque sauces, salad dressings, and the like. These condiments are primarily comprised of liquids and are generally available only in liquid form. There is a consumer need for dry, solid condiments which provide the customer with greater convenience. For example, there is a need for a dry steak sauce flavoring condiment. Condiments such as steak sauces are often used outdoors where liquid sauces and glass bottling present greater disadvantages. A solid condiment avoids these disadvantages by providing a product that is dry, premixed, easily stored, conveniently shipped or transported, and easily mixed with the juices of the food (e.g., meat) or other aqueous liquid to provide a liquid sauce. The added convenience to consumers demonstrate the desireability of providing a dry, solid condiment.

It would be highly desirable to provide a product for enhancing the flavor of meat and other foods and a process for producing a dry flavor enhancing condiment useful to enhance the flavor of food such as steak.

SUMMARY OF THE INVENTION

The present invention relates to a process for providing a dry condiment suitable as a steak sauce. Typical steak sauce ingredients are extracted with an extraction solvent (e.g., a liquid having an aqueous character and preferably essentially pure water). Preferably, from about 70 percent to 95 percent by weight of the weight of the starting steak sauce ingredients is extracted. The steak sauce extract is separated from the extracted steak sauce ingredients and subjected to heat treatment. The heat treatment occurs in a pressure-controlled environment at a temperature above about 100° C., and results in a steak sauce extract having steak sauce derived flavor and aroma. The heat treated extract is then contacted with a substrate to provide a dry steak sauce condiment. Alternatively, the extract treated substrate can be dehydrated and ground into a powder to provide a dry powdered steak sauce condiment. The process of the present invention has applicability to liquid sauces and condiments other than steak sauce and having a variety of ingredients.

DETAILED DESCRIPTION OF THE PREFERRED EMBODIMENTS

Figure 1:
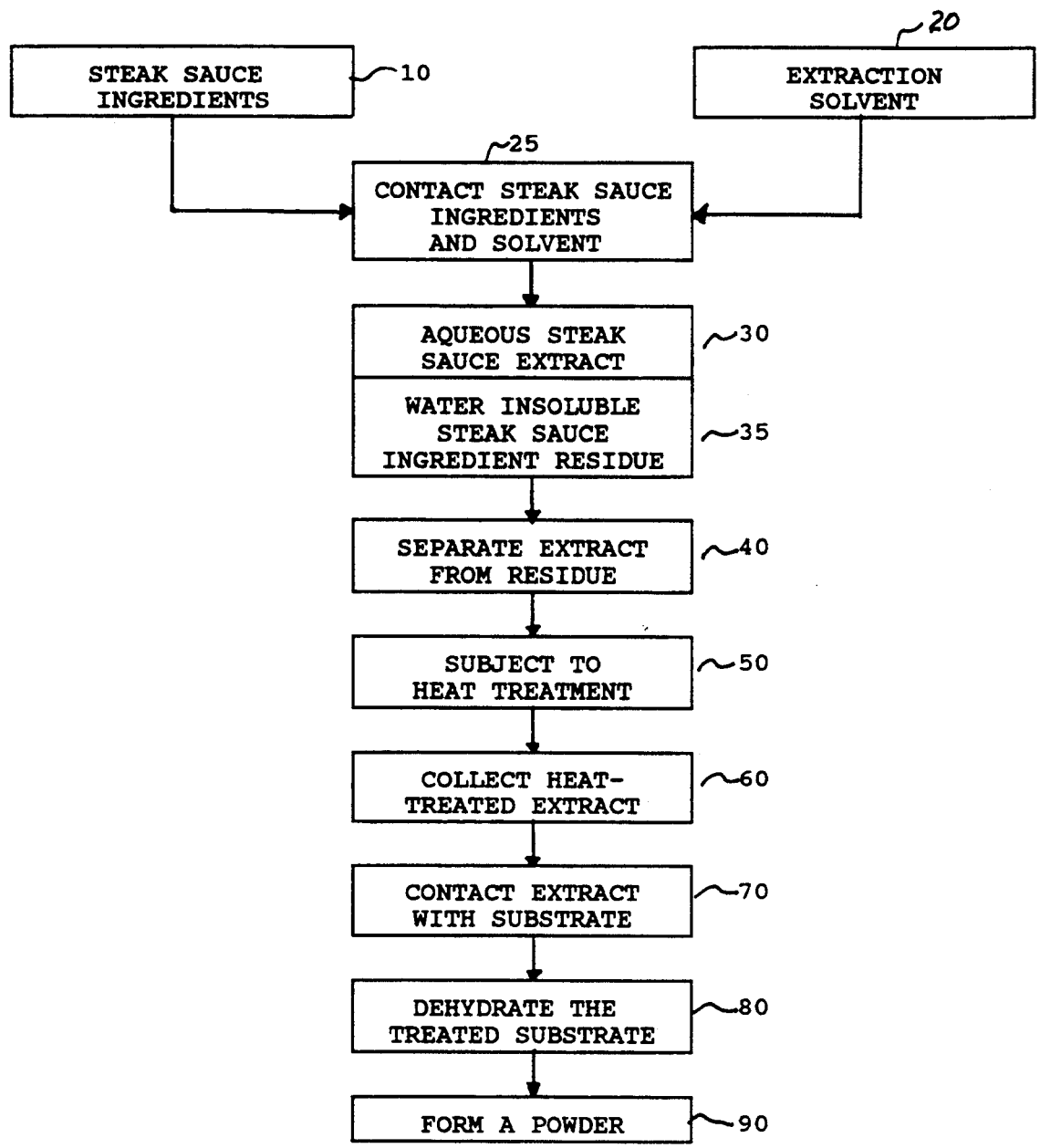
FIG. 1 is a schematic diagram of process steps representative of an embodiment of the present invention.

Referring to FIG. 1, in one embodiment steak sauce ingredients 10, comprising the ingredients of typical steak sauces, are contacted 25 with an aqueous extraction solvent 20. As such various soluble components are extracted from the steak sauce ingredients 10 yielding an aqueous steak sauce extract 30 and insoluble extracted steak sauce ingredients 35. A portion of the aqueous steak sauce extract 30 is separated 40 from the insoluble extracted steak sauce ingredients 35. The extracted steak sauce ingredients can be separated from the solvent by filtration or other suitable techniques. The steak sauce extract is subjected 50 to heat treatment in a pressure controlled environment. Additives such as at least one amino acid and/or sugar or flavorants can be incorporated into the steak sauce extract prior to the heat treatment. The resulting steak sauce extract having flavor and aroma derived from steak sauce components is then collected 60. The steak sauce extract is contacted with 70 and absorbed onto a tasteless, odorless substrate. Optionally, the treated substrate can be dehydrated 80 and formed 90 into a powder (e.g., pulverized) to provide a flavorable composition which may be used as a food condiment.

The term "steak sauce ingredients" as used herein refers to the mixture of the ingredients which typically comprises the liquid condiment commonly known as steak sauce. Various formulations of steak sauces are known. Ingredients which comprise typical steak sauce formulations include tomatoes, vinegar, anchovies, hot red peppers, sugar, corn syrup, brown sugar, molasses, raisins, dates, salt (sodium chloride), soy, soybean oil, spices and herbs, bourbon, tumeric, fruit (e.g., orange, lemon and grapefruit) juices and/or peels, garlic, onion, apples, tamarinds, caramel color and other natural and artificial flavorings For example "A.1. ® Steak Sauce", available from Nabisco Brands includes tomato puree, distilled vinegar, corn syrup, raisins, salt, spices and herbs, orange, lemon and grapefruit juices, orange peel, dehydrated garlic and onions and caramel color. It is recognized that other flavorful ingredients may also be incorporated into a steak sauce formulation, the selection of which will be within the skill of one in the art. Additionally other liquid sauces and ingredients can be extracted and heated in the same manner as steak sauce ingredients.

The ingredients can be divided into two groups: (1) ingredients which are easily extracted or are soluble in the extraction solvent, or (2) solids which are not easily extracted. Exemplary ingredients which are easily extracted or are substantially soluble in the extraction solvent include molasses, corn syrup, salt and the various fruit juices. Exemplary solid ingredients which are not easily extracted include spices and herbs, various fruit peels, and various vegetable matter.

The manner in which the steak sauce ingredients are extracted, and the type of solvent employed, can vary. For example, the steak sauce ingredients can be extracted using organic solvents (e.g., ethane, propane, butane, hexane, pentane, methanol or ethanol), halocarbons and halogenated hydrocarbons, supercritical fluids (e.g., supercritical. carbon dioxide, supercritical sulfur hexafluoride, and ethane, propane and butane in supercritical form), modified supercritical fluids (e.g., supercritical carbon dioxide modified with methanol), and the like. Preferably, the steak sauce extract is provided by extracting the steak sauce ingredients using a liquid having an aqueous character. Such a liquid consists primarily of water, normally greater than about 90 weight percent water, and can be essentially pure water in certain circumstances. For example, a solvent having an aqueous character can be distilled water, tap water, or the like. However, a solvent having an aqueous character can include water having substances such as pH buffers, pH adjusters, organic and inorganic salts, sugars, amino acids or surfactants incorporated therein. The solvent also can be a co-solvent mixture of water and minor amounts of one or more solvents which are miscible therewith.

The conditions under which the extraction is performed can vary. Conditions of temperature can be less than, greater than, or equal to, ambient temperature. Typical temperatures range from about 5° C. to about 125° C., often about 10° C. to about 90° C. and frequently about 15° C. to about 85° C. The extraction is performed at an optimized solvent to steak sauce ingredients ratio, namely at a ratio wherein a relatively large amount of extract is extracted from steak sauce ingredients using a minimum amount of solvent. Typically, about 9 weight parts solvent for each weight part of steak sauce ingredients will adequately extract the soluble components. Typically, the lower amount of solvent used, the more concentrated the extract within the solvent will be. Typically, the weight of solvent to steak sauce ingredients for extraction is about 9 to about 3 weight parts of solvent for each weight part of steak sauce ingredients, and often is about 8 to about 5 weight parts solvent for each weight part of steak sauce ingredients.

A wide variety of components are extracted from the steak sauce ingredients. The particular components and the amounts of components which are extracted often depend on the ingredients used. Typically, about 70 percent to about 95 percent of the total weight of the starting steak sauce ingredients (on a dry weight basis) is extracted and the extract separated from the extracted steak sauce ingredients. Pure water extraction solvent will most often extract primarily the water soluble components of the steak sauce ingredients. Exemplary water soluble components include proteins and lipids, reducing sugars, salts, disaccharides, starches, pentosans and the like. For these items up to about 50 percent of the dry weight of the ingredients are extractable, normally the level is at least about 5 percent, typically at least about 20 percent and often about 30 to 50 percent.

Methods for extracting components from the steak sauce ingredients, separating extracts from unextracted steak sauce ingredients and isolating steak sauce extracts will be apparent to the skilled artisan. For example, it is desirable to subject an aqueous extract to filtration as a suitable means of removing the insoluble extracted steak sauce ingredients. Also, the extraction of other liquid sauces and ingredients will be within the skill of one in the art.

The extracted steak sauce ingredient components can be provided at a predetermined solvent level (e.g., in a predetermined high moisture form) by evaporating the solvent from the mixture of solvent and extract. Vacuum distillation and thin film evaporation techniques are particularly preferred. Typically, the extract has a moisture content of at least 5 percent based on the total weight of the solvent and extract, and preferably has a moisture content of about 30 to about 95 percent based on the total weight.

The moderately high temperature treatment is performed in a pressure controlled environment. Such an environment is provided by enclosing the steak sauce extract in an air sealed vessel or chamber. Typically, a pressure controlled environment is provided using a pressure vessel or chamber which is capable of withstanding relatively high pressures. Such vessels or chambers (i) provide enclosure or concealment of the steak sauce extract such that any volatile flavor components generated are not lost or do not otherwise escape during the moderately high temperature treatment step, and (ii) provide for treatment of the steak sauce extract at a temperature significantly above about 100° C. Preferred pressure vessels are equipped with an external heating source. Examples of vessels which provide a pressure controlled environment include a high pressure autoclave from Berghof/America Inc. of Concord, Calif. and a Parr Reactor Model No. 4552 available from The Parr Instrument Co. Operation of such exemplary vessels will be apparent to the skilled artisan. Typical pressures experienced by the steak sauce extract during the process of the present invention range from about 10 psig to about 1,000 psig, normally from about 20 psig to about 500 psig. Pressures experienced by the steak sauce extract typically exceed 100 psig during the process of the present invention.

The amount of time that the steak sauce extract is subjected to the moderately high temperature treatment can vary. Normally, the time period is sufficient to heat the steak sauce extract at the desired temperature for a period of at least about 10 minutes, preferably at least about 60 minutes. Normally, the time period is less than about 3 hours, preferably less than about 2 hours. It is desirable to control the time/temperature profile of the steak sauce extract subjected to heat treatment so that it is not subjected to a particularly high temperature for a lengthy period of time. It is highly desirable to employ a pressure vessel design or a vessel equipped with an agitation mechanism such that the steak sauce extract experiences a relatively uniform temperature throughout the treatment period. In particular, it is highly desirable for the steak sauce extract to be heated uniformly throughout as much as possible at the maximum temperature to which the extract is subjected.

Conditions provided during the process of the present invention most desirably are such that certain components of the steak sauce extract undergo Maillard or Browning Reactions. Such reactions are reactions between (i) the amino substituents of amino acids, peptides, proteins or other nitrogen-containing compounds, and (ii) the carbonyl group of a sugar in the reducing form or other carboxyl-containing compounds. The reactions can be facilitated by adding from about 5 to about 30 percent by weight of one or more sugar, sugar analog, amino acid or amino acid analog. Examples of suitable sugars are fructose, glucose, sucrose, rhamnose and mannose. Examples of suitable sugar analogs are α di-carbonyls such as 2,5-dimethyl-4-hydroxy-3-(2H)-furanone, 4,5-dimethyl-3-hydroxy-2-(5H)-furanone, maltol, and methylcyclopentenolone. Exemplary amino acids include asparagine, glutamine, phenylalanine, threonine, aspartic acid, proline, glutamic acid, serine, hydroxyproline, and the like. Exemplary amino acid analogs include ammonia, primary amines and secondary amines (e.g., $RNH_2$ or $R_2NH$ wherein $R=C_1-C_{10}$). The reactions often result in a moist steak sauce extract of increased viscosity, particularly when the extract is subjected to relatively high temperature treatment for a relatively long period of time.

If desired, flavoring agents (e.g., cocoa, licorice, St. John's bread and the like) can also be added to the extract.

After the steak sauce extract has been subjected to the moderately high temperature treatment for the controlled period of time, the extract is collected using techniques known in the art. The isolated extract containing the steak sauce ingredient-derived components is then contacted with and absorbed onto a virtually tasteless, odorless substrate. Suitable substrates include natural, water soluble, starch-based materials such as those derived from grains products. Exemplary substrates include puffed grains (e.g., rice), alginate, various gums, carregeenans, Konjac flour and grain flours. The substrate, onto which the steak sauce extract is absorbed is subsequently dehydrated using conventional dehydration techniques. The dehydrated, treated substrate may then be subjected to conditions sufficient to provide a powder, such as pulverizing in a grinder. The dry, powdered steak sauce condiment can be applied to foodstuffs such as beef, pork, poultry, fish, venison or other meats or foods to provide a flavorful seasoning similar to that provided by commonly known, readily available liquid steak sauces. Other liquid condiments (e.g., barbeque sauce and salad dressing) can be made into a dry condiment using the process of the present invention.

The following example is provided in order to further illustrate preferred aspects of the invention but should not be construed as limiting the scope thereof. Unless otherwise noted, all parts and percentages are by weight.

EXAMPLE 1

A mixture of steak sauce ingredients having the following formulation is prepared in a vessel suitable for extraction.

TABLE 1

| Dry tomatoes | 73.2 g |
|---|---|
| Molasses | 148 g |
| Raisin concentrate | 56 g |
| Salt | 56 g |
| Tang (orange drink crystals) | 30.8 g |
| Ginger | 17 g |
| Spice pre-blend | 7.8 g |

The spice pre-blend is prepared by combining the following ingredients in the specified amounts.

TABLE 2

| Nutmeg | 32.5% |
|---|---|
| Garlic granulated dehydrated | 28.9% |
| Onion granulated dehydrated | 15.6% |
| White pepper | 6.4% |
| Thyme, ground | 4.2% |
| Red pepper, ground | 3.2% |
| Marjoram, ground | 2.8% |
| Bay leaves, ground | 2.1% |
| Celery seed | 2.1% |
| Sweet Basil | 2.1% |

The foregoing mixture is extracted with 980 ml of water over a 24 hour period at 15° C. At the end of 24 hours, the insoluble steak sauce ingredients are separated from the extract by filtration through a milk filter. The steak sauce extract is placed in Parr Reactor No. 4552, sealed and heated to about 130° C. for 1 hour. A pressure of about 20 psig is obtained. The reactor is cooled employing cold water to the surface of the bomb until the pressure returns to normal. The vessel is opened and the heat treated extract is removed. The heat treated extract is then absorbed on a substrate of puffed rice. The treated substrate is dehydrated in an American Harvest food dehydrator at 135° F. The dried, treated substrate is then ground in a coffee bean grinder to form a powder. The taste and flavor of the dry, powdered condiment steak sauce is similar to that of readily available liquid steak sauces.

The foregoing example is illustrative of the present invention, and should not be construed as limiting thereof. The invention is defined by the following claims, with equivalents of the claims to be included therein.

As used herein, the term "powder" in referring to the dry food condiment means a material capable having a free-flowing solid form. Also, the dry condiment typically has a moisture content of less than about 15 weight percent, and often about 2 to about 12 weight percent.

That which is claimed is:

1. A process for providing a flavorful composition for use as a food condiment, the process comprising the steps of:
   (a) extracting a mixture of steak sauce ingredients with an extraction solvent selected from the group consisting of organic solvents, halocarbons, halogenated hydrocarbons, supercritical fluids, modified supercritical fluids, and liquids having an aqueous character, under conditions sufficient to provide a liquid steak sauce extract;
   (b) separating the liquid steak sauce extract from the extracted mixture of steak sauce ingredients;
   (c) heating the liquid steak sauce extract in a pressure-controlled environment to above ambient pressure at a temperature above about 100° C.; and
   (d) contacting the heat treated liquid steak sauce extract with a substrate to provide a substrate having the heat treated liquid steak sauce extract thereon.

2. The process according to claim 1 whereby the steak sauce ingredients comprise a mixture of at least ingredients selected from the group consisting of tomatoes, molasses, raisins, salt, orange, lemon, grapefruit, ginger, nutmeg, garlic, onion, white pepper, thyme, red pepper, marjoram, bay leaves, celery, and sweet basil.

3. The process according to claim 1 whereby the extraction solvent is water.

4. The process according to claim 3 whereby the weight of solvent to steak sauce ingredients is about 8 to 5 weight parts solvent for each weight part of steak sauce ingredients.

5. The process according to claim 1 whereby the liquid steak sauce extract is contacted with at least one sugar or sugar analog prior to heat treatment.

6. The process according to claim 1 whereby the liquid steak sauce extract is contacted with at least one amino acid or amino acid analog prior to heat treatment.

7. The process according to claim 1 whereby the liquid steak sauce extract is subjected to heat treatment at a temperature above 120° C. and at a pressure of about 20 psig to about 500 psig.

8. The process according to claim 1 whereby the substrate is selected from the group consisting of grains, alginate, gums, carregeenans and flours.

9. The flavorful composition provided according to the process of claim 1.

10. A process for providing a dry condiment suitable as a steak sauce, the process comprising the steps of:
   (a) extracting a liquid steak sauce extract from a mixture of steak sauce ingredients with an extraction solvent selected from the group consisting of organic solvents, halocarbons, halogenated hydrocarbons, supercritical fluids, modified supercritical fluids, and liquids having an aqueous character, under conditions sufficient to provide a liquid steak sauce extract;
   (b) separating the liquid steak sauce extract from the extracted mixture of steak sauce ingredients;

(c) heating the liquid steak sauce extract in a pressure-controlled environment to above ambient pressure at a temperature above about 100° C.;

(d) contacting the heat treated liquid steak sauce extract with a substrate to provide a substrate having the heat treated liquid steak sauce extract absorbed thereon; and (e) dehydrating the substrate having the heat treated liquid steak sauce extract thereon (f) subjecting the dehydrated, treated substrate to conditions sufficient to provide a dry, powdered condiment.

11. The process according to claim 10 whereby the steak sauce ingredients comprise a mixture of at least ingredients selected from the group consisting of tomatoes, molasses, raisins, salt, orange, lemon, grapefruit, ginger, nutmeg, garlic, onion, white pepper, thyme, red pepper, marjoram, bay leaves, celery, sweet basil.

12. The process according to claim 10 whereby the extraction solvent is a water.

13. The process according to claim 12 whereby the weight of solvent to steak sauce ingredients is about 8 to 5 weight parts solvent for each weight part of steak sauce ingredients.

14. The process according to claim 10 whereby the liquid steak sauce extract is contacted with at least one amino acid or amino acid analog prior to heat treatment.

15. The process according to claim 10 whereby the liquid steak sauce extract is contacted with at least one amino acid or amino acid analog prior to heat treatment.

16. The process according to claim 10 whereby the liquid steak sauce extract is subjected to heat treatment at a temperature above 120° C. and at a pressure of about 20 psig to about 500 psig.

17. The process according to claim 10 whereby the substrate is selected from the group consisting of grains, alginate, carregeenans and flours.

18. The dry condiment provided according to the process of claim 10.

* * * * *